(12) United States Patent
Peng et al.

(10) Patent No.: US 8,549,812 B1
(45) Date of Patent: Oct. 8, 2013

(54) MULTI-SECTION TELESCOPING STRUCTURE

(71) Applicants: Wei Peng, Shenzhen (CN); Wen-Jing Liu, Shenzhen (CN); Hsing-Yi Hu, New Taipei (TW)

(72) Inventors: Wei Peng, Shenzhen (CN); Wen-Jing Liu, Shenzhen (CN); Hsing-Yi Hu, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/685,628

(22) Filed: Nov. 26, 2012

(30) Foreign Application Priority Data

Mar. 13, 2012 (CN) .......................... 2012 1 0064861

(51) Int. Cl.
*E04G 25/00* (2006.01)
*E04H 12/18* (2006.01)
*E04C 3/00* (2006.01)
*B66C 23/04* (2006.01)

(52) U.S. Cl.
USPC ................. 52/632; 52/834; 52/843; 212/348; 212/350

(58) Field of Classification Search
USPC ................... 52/67, 110, 632, 651.01, 651.02, 52/651.05, 834, 836, 838, 843, 121; 212/230, 212/264, 348, 350; 606/1
See application file for complete search history.

(56) References Cited

U.S. PATENT DOCUMENTS

| | | | | |
|---|---|---|---|---|
| 3,495,370 A | * | 2/1970 | Habro et al. ..................... | 52/632 |
| 3,902,070 A | * | 8/1975 | Amor et al. .................... | 378/194 |
| 3,913,953 A | * | 10/1975 | Archer et al. ............... | 285/292.1 |
| 4,168,008 A | * | 9/1979 | Granryd ........................ | 212/350 |
| 4,257,201 A | * | 3/1981 | Landolt et al. .................. | 52/118 |
| 4,357,785 A | * | 11/1982 | Eklund ........................... | 52/632 |
| 4,478,014 A | * | 10/1984 | Poock et al. ................... | 52/115 |
| 4,506,480 A | * | 3/1985 | Murrill et al. ................... | 52/121 |
| 5,020,323 A | * | 6/1991 | Hurlimann ...................... | 60/413 |
| 5,035,094 A | * | 7/1991 | Legare ........................... | 52/118 |
| 5,158,189 A | * | 10/1992 | Watson et al. ............... | 212/350 |
| 5,624,046 A | * | 4/1997 | Zimmermann ............... | 212/349 |
| 7,574,832 B1 | * | 8/2009 | Lieberman ..................... | 52/118 |
| 7,966,777 B2 | * | 6/2011 | Douglas et al. ................. | 52/118 |
| 8,042,305 B2 | * | 10/2011 | Pryor et al. .................... | 52/121 |
| 2002/0050112 A1 | * | 5/2002 | Koch et al. ................. | 52/651.07 |
| 2008/0236060 A1 | * | 10/2008 | Battaglia ......................... | 52/121 |
| 2009/0145056 A1 | * | 6/2009 | Pereira ........................... | 52/111 |
| 2011/0225903 A1 | * | 9/2011 | Lounis et al. ................ | 52/122.1 |

* cited by examiner

*Primary Examiner* — Ryan Kwiecinski
(74) *Attorney, Agent, or Firm* — Altis & Wispro Law Group, Inc.

(57) ABSTRACT

A telescoping structure includes a hollow outer section and a hollow inner section slidably mounted in the hollow outer section. The hollow outer section includes a first sidewall, a second sidewall and a third sidewall. The hollow inner section includes a fourth sidewall, a fifth sidewall and a sixth sidewall. A pair of sliding rails is disposed on the interior side of the first sidewall and a pair of raised sliding grooves is defined on the exterior side of the fourth sidewall. The pair of raised sliding grooves engages with the pair of sliding rails to enable a sliding movement of the hollow inner section relative to the hollow outer section.

2 Claims, 6 Drawing Sheets

MULTI-SECTION TELESCOPING STRUCTURE

REFERENCE TO RELATED APPLICATIONS

This application claims all benefits accruing under 35 U.S.C. §119 from China Patent Application No. 201210064861.7, filed on Mar. 13, 2012 in the State Intellectual Property Office of China, the contents of the China Application are hereby incorporated by reference.

BACKGROUND

1. Technical Field

The present disclosure generally relates to telescoping structures, and particularly relates to a multi-section telescoping structure for selectively extending and retracting telescopic sections.

2. Description of Related Art

Telescoping structures are widely used in engineering fields, such as elevating platforms, medical instruments, wireless communication devices and the like. However, the telescoping structures of related art are sufficiently accurate in their telescoping movement, especially in those fields which require high accuracy, such as in medical instruments.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
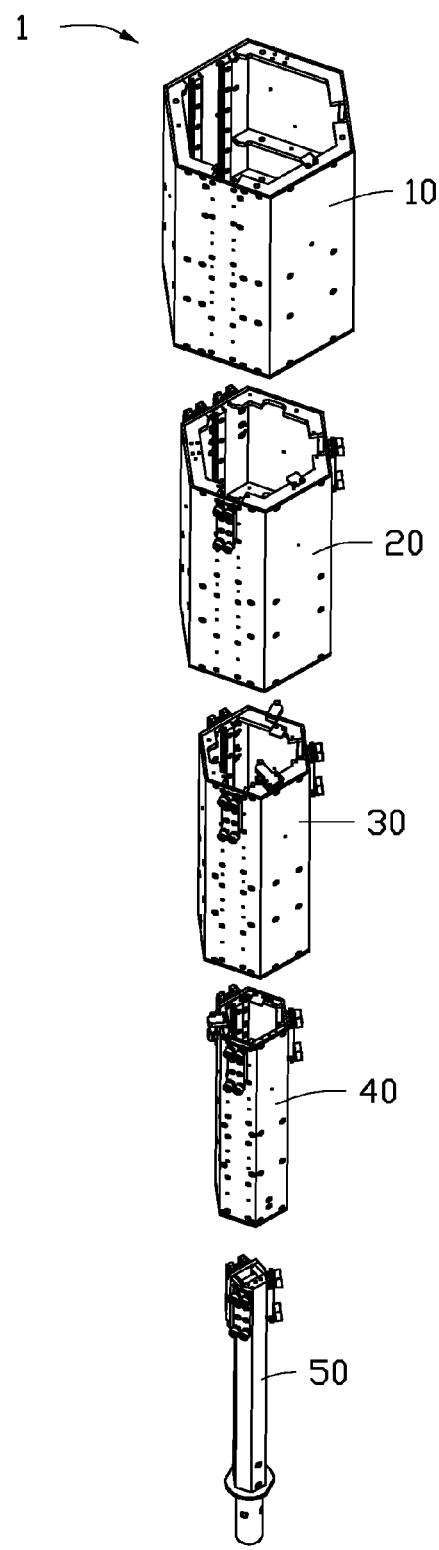
FIG. 1 is an exploded, isometric view of a telescoping structure in accordance with an embodiment.

FIG. 1 shows a telescoping structure 1 in accordance with an embodiment. The telescoping structure 1 includes a hollow outer section 10, and a first to fourth hollow inner sections 20, 30, 40, and 50. The first hollow inner section 20 is slidably mounted in the hollow outer section 10. The second hollow inner section 30 is slidably mounted in the first hollow inner section 20. The third hollow inner section 40 is slidably mounted in the second hollow inner section 30. The fourth hollow inner section 50 is slidably mounted in the third hollow inner section 40. The fourth hollow inner section 50 may be connected a device which is configured to be driven by the telescoping structure. The second to fourth hollow inner sections 30 to 50 have a structure substantially identical to the first hollow inner section 20. The following description is thus given based on the hollow outer section 10 and the first hollow inner section 20.

Figure 2:
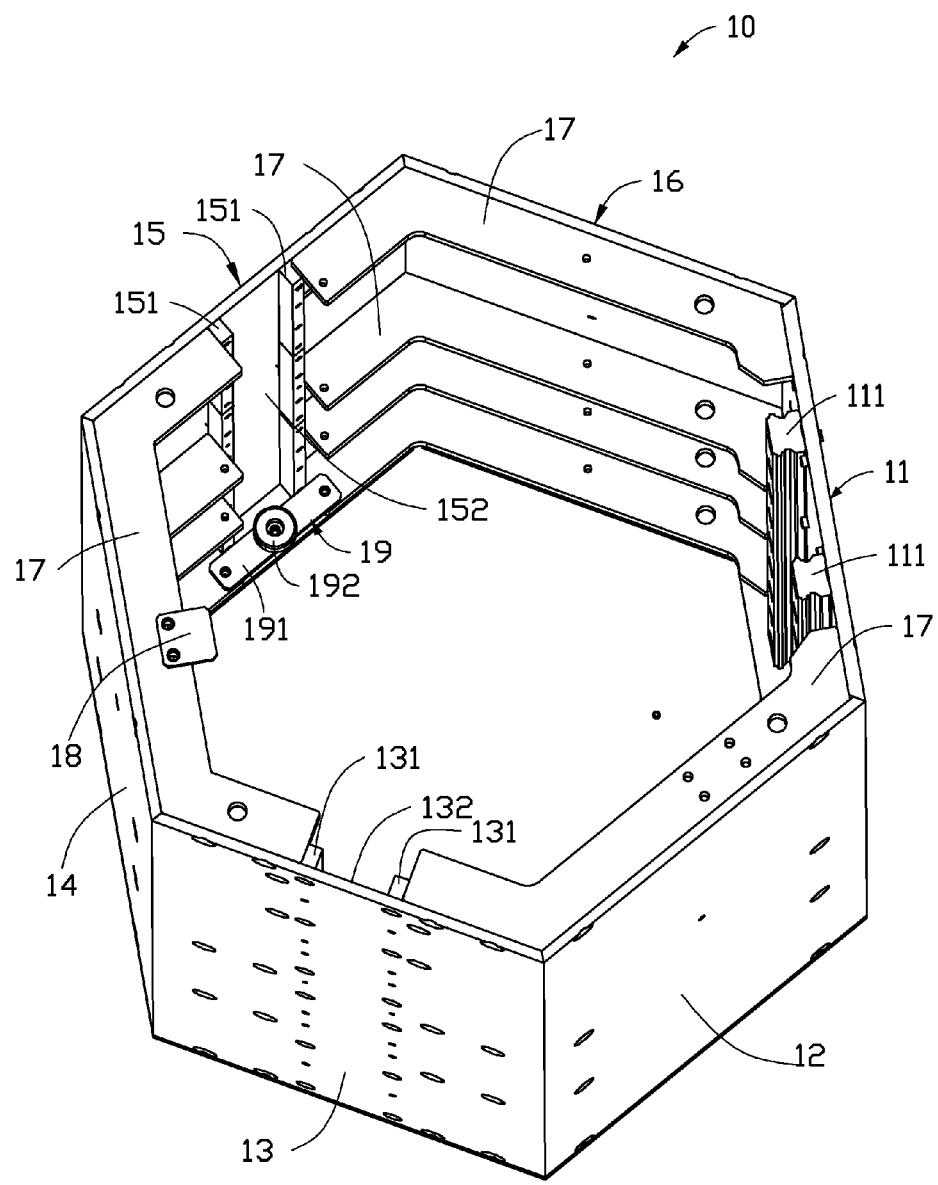
FIG. 2 is an isometric view of a hollow outer section of the telescoping structure of FIG. 1.

The hollow outer section 10 is a hollow straight prism having two openings. Referring to FIG. 2, the hollow outer section 10 is a tube in the shape of a regular hexagonal prism which has a first to sixth sidewalls 11, 12, 13, 14, 15, and 16. The first to sixth sidewalls 11 to 16 are connected together to form a regular hexagonal prism by a plurality of first ribs 17. Each of the first ribs 17 spans and interconnects three of the first to sixth sidewalls 11 to 16.

The hollow outer section 10 includes a first top blocking member 18, at its top opening, and a first bottom blocking member 19, at its bottom opening. The first top blocking member 18 may prevent the first hollow inner section 20 from moving out of the top opening of the hollow outer section 10. In an embodiment, the first top blocking member 18 is a rectangular metal plate. A first edge of the first top blocking member 18 is mounted to the hollow outer section 10. A second edge of the first top blocking member 18 extends towards the central axis of the hollow outer section 10. The second edge is opposite to the first edge.

The first bottom blocking member 19 may prevent the first hollow inner section 20 from disengaging from the hollow outer section 10 through the bottom opening. The first bottom blocking member 19 includes a first mounting portion 191 and a first elastic portion 192. The first elastic portion 192 may be made of plastic or other elastic material. The first mounting portion 191 is mounted to the hollow outer section 10. The first elastic portion 192 protrudes upward from a top surface of the first mounting portion 191. The first elastic portion 192 may cushion the impact when the first hollow inner section 20 reaches the limit of travel allowed by the hollow outer section 10.

A pair of first sliding rails 111 are arranged on the interior surface of the first sidewall 11 of the hollow outer section 10. Each of the pair of first sliding rails 111 extends along a direction parallel to the central axis of the hollow outer section 10. The pair of first sliding rails 111 are spaced.

The third sidewall 13 of the hollow outer section 10 defines a first guiding groove 132. The fifth sidewall 15 of the hollow outer section 10 defines a second guiding groove 152. Each of the first sidewall 11, the third sidewall 13, and the fifth sidewall 15 is not adjacent to one another. The first guiding groove 132 is formed by a pair of first spaced guiding bars 131. The second guiding groove 152 is formed by a pair of second spaced guiding bars 151. The first guiding groove 132 and the second guiding groove 152 extend along a direction in parallel with the central axis of the hollow outer section 10.

Figure 3:
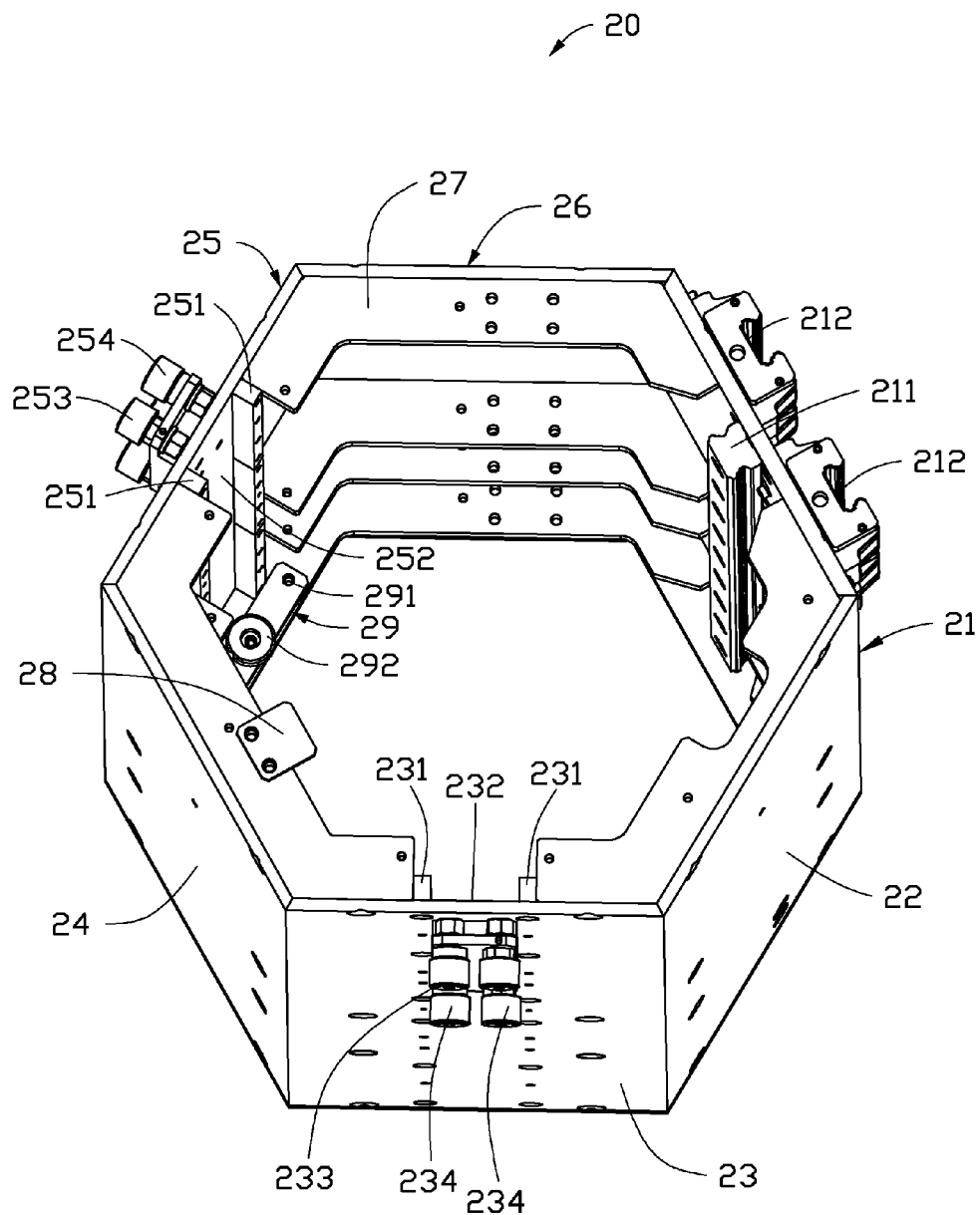
FIG. 3 is an isometric view of a first inner section of the telescoping structure of FIG. 1.
Figure 4:
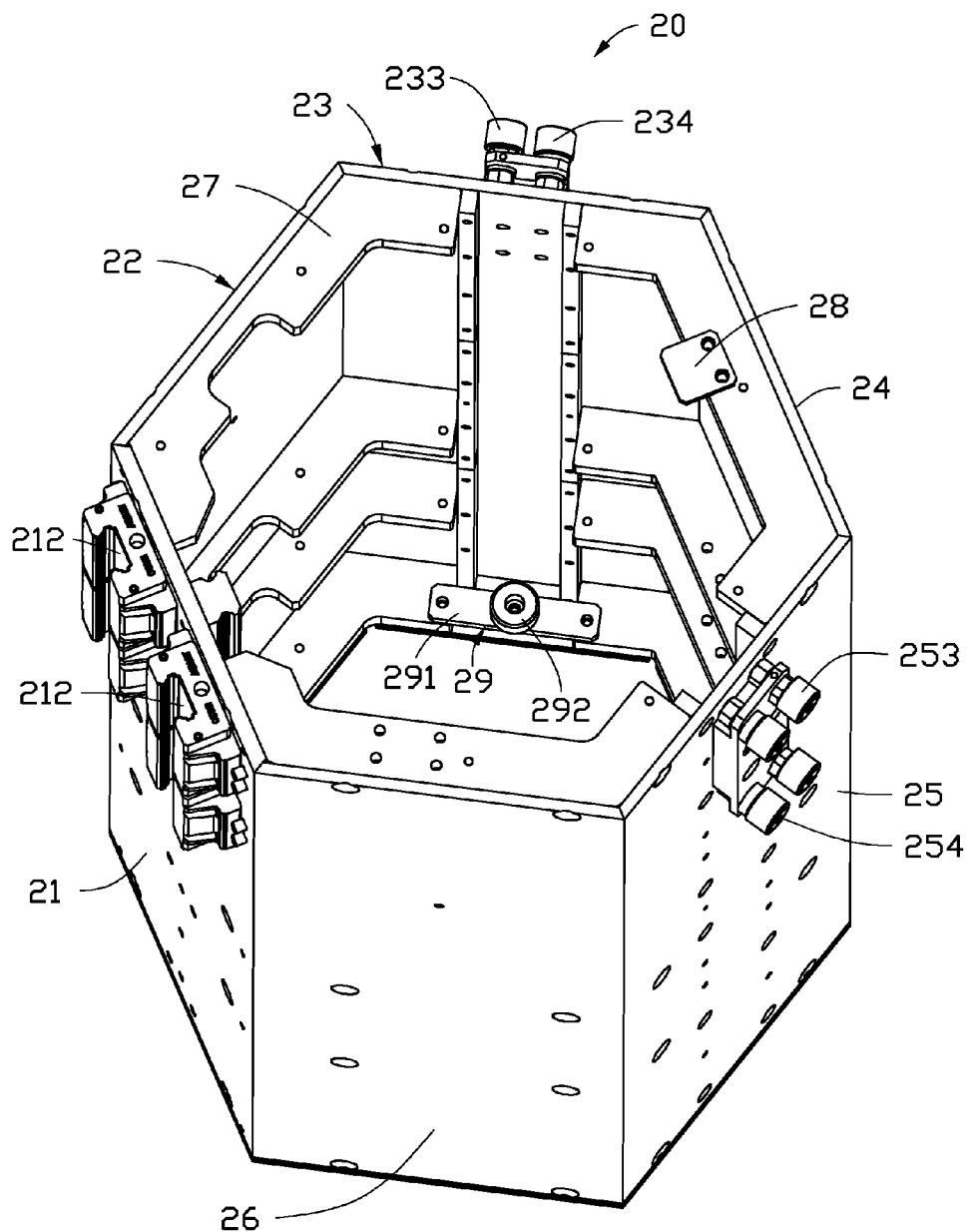
FIG. 4 is similar to FIG. 3, but viewed from a different aspect.

The first hollow inner section 20 is a hollow straight prism having two openings. Referring to FIGS. 3 and 4, the first hollow inner section 20 is a tube in the shape of a regular hexagonal prism which has a seventh to twelfth sidewalls 21, 22, 23, 24, 25, and 26. A plurality of second ribs 27 holds the seventh to twelfth sidewalls 21 to 26 together to form the regular hexagonal prism. Each of the second ribs 27 spans and interconnects three of the seventh to twelfth sidewalls 21 to 26.

The inner structure of the first hollow inner section 20 is similar to the inner structure of the hollow outer section 10. For example, the first hollow inner section 20 includes a second top blocking member 28 similar to the first top blocking member 18, a second bottom blocking member 29 similar to the first bottom blocking member 19, a second sliding rail 211 similar to the first sliding rail 111, a third guiding groove 232 similar to the first guiding groove 132, and a fourth guiding groove 252 similar to the second guiding groove 152. The second bottom blocking member 29 includes a second mounting portion 291 similar to the first mounting portion 191 and a second elastic portion 292 similar to the first elastic portion 192. The third guiding groove 232 is formed by a pair of third spaced guiding bars 231. The fourth guiding groove 252 is formed by a pair of fourth spaced guiding bars 251. The third guiding groove 232 and the fourth guiding groove 252 extend along a direction in parallel with the central axis of the hollow outer section 10.

A pair of first raised sliding grooves 212 are arranged on the exterior surface of the seventh sidewall 21. The pair of first raised sliding grooves 212 are spaced and extend along a direction in parallel with the central axis of the first hollow inner section 20.

A first cam follower 233 is arranged on the exterior surface of the ninth sidewall 23. The first cam follower 233 includes four rotating wheels 234. A second cam follower 253 is arranged on the exterior surface of the eleventh sidewall 25. The second cam follower 253 includes four rotating wheels 254.

The second to fourth hollow inner sections 30 to 50 have a structure similar to that of the first hollow inner section 20.

Figure 5:
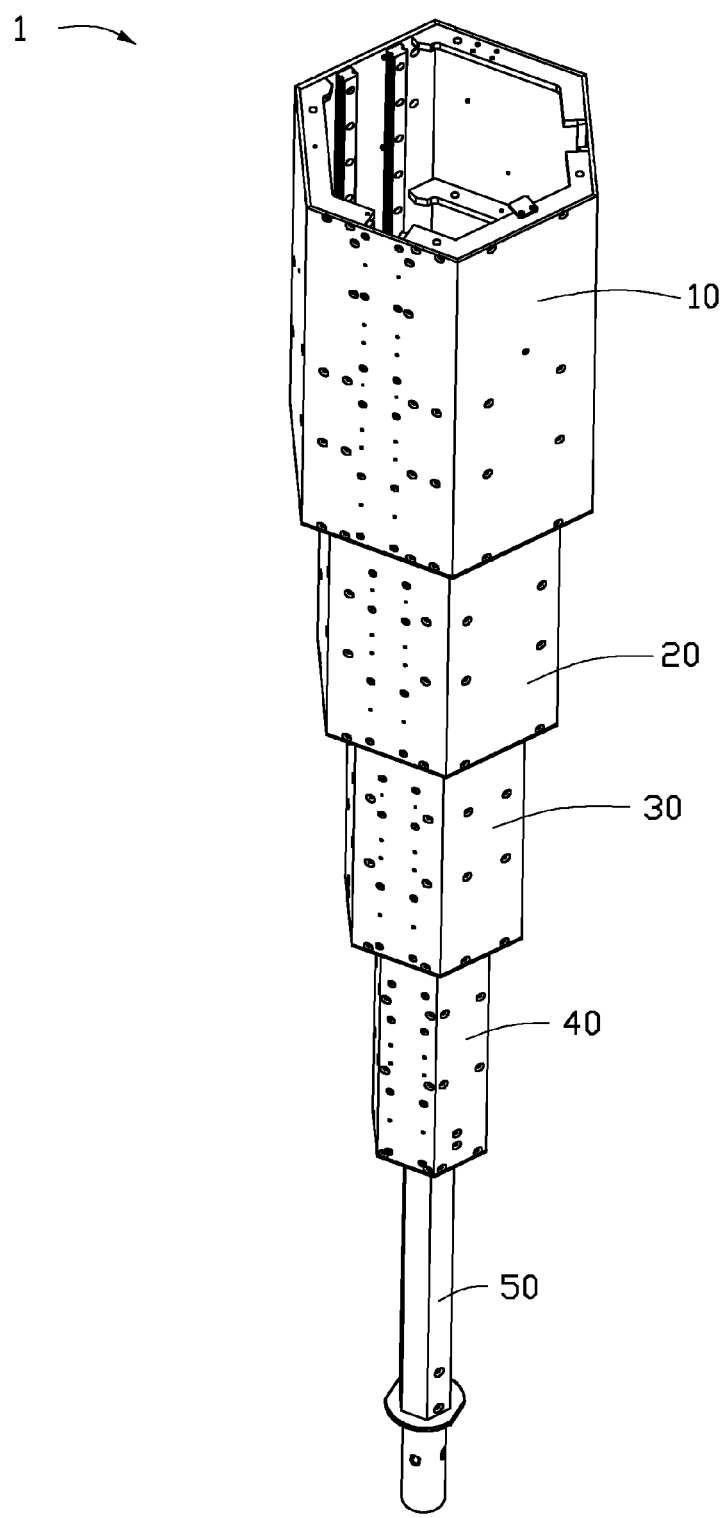
FIG. 5 is an assembled view of the telescoping structure of FIG. 1.
Figure 6:
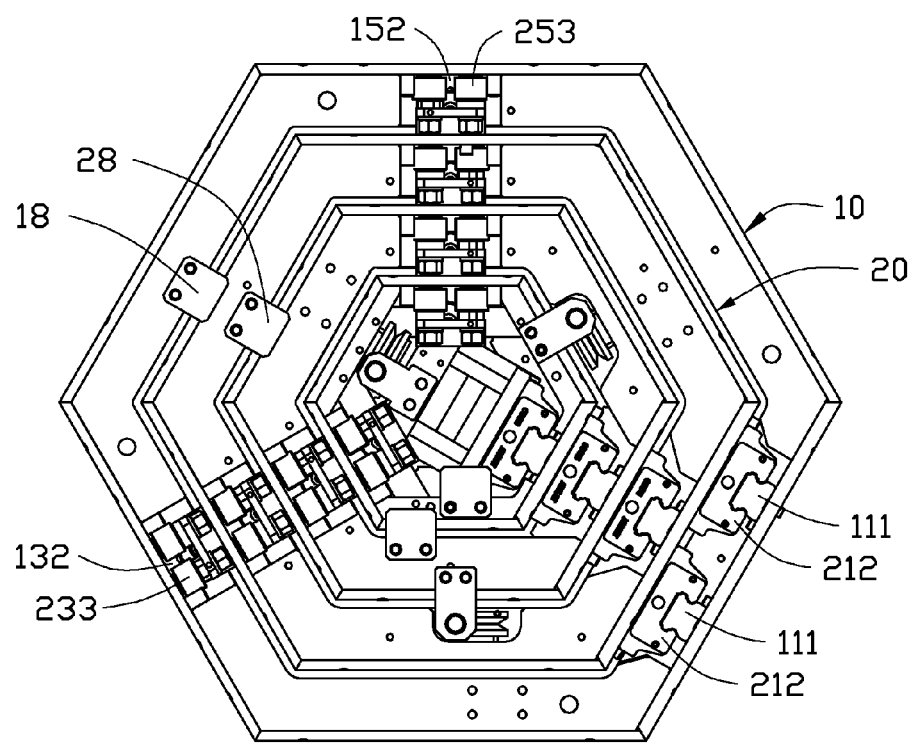
FIG. 6 is similar to FIG. 5, but viewed from a different aspect.

Referring to FIGS. 5 and 6, in assembly, the top end of the first hollow inner section 20 is inserted into the hollow outer section 10. The pair of sliding rails 111 of the hollow outer section 10 engages in the pair of raised sliding grooves 212 of the first hollow inner section 20. The first cam follower 233, of the first hollow inner section 20, is received in the first guiding groove 132, of the hollow outer section 10, so that the four rotating wheels 234 make contact with the interior surfaces, of the pair of first guiding bars 131. The second cam follower 253 of the first hollow inner section 20 is received in the second guiding groove 152, of the hollow outer section 10, so that the four rotating wheels 254 contact the pair of second guiding bars 151. Thus, a sliding movement of the first hollow inner section 20 relative to the hollow outer section 10 is facilitated. The first hollow inner section 20 is movable between a fully retracted position, in which the first hollow inner section 20 is substantially inserted in the hollow outer section 10, and an extended position, in which the first hollow inner section 20 projects outwards from the hollow outer section 10. Similarly, the second hollow inner section 30 can be slidably mounted in the first hollow inner section 20, the third hollow inner section 40 can be slidably mounted in the second hollow inner section 30, and the fourth hollow inner section 50 can be slidably mounted in the third hollow inner section 40. In use, the telescoping structure 1 is operable by selectively extending and retracting the first to fourth hollow inner sections 20 to 40.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A telescoping structure, comprising:
    a hollow outer section comprising a first sidewall, a second sidewall, and a third sidewall, and a pair of sliding rails arranged on an interior surface of the first sidewall, the second sidewall defining a first guiding groove, the third sidewall defining a second guiding groove; and
    a hollow inner section slidably mounted in the hollow outer section, the hollow inner section comprising a fourth sidewall, a fifth sidewall, and a sixth sidewall, a pair of raised grooves arranged on an exterior surface of the fourth sidewall, a first cam follower arranged on an exterior surface of the fifth sidewall, and a second cam follower arranged on an exterior surface of the sixth sidewall;
    wherein the pair of sliding rails are engaged in the pair of raised grooves, the first cam follower is received in the first guiding groove, the second cam follower is received in the second guiding groove, so that the hollow inner section is movable between a retracted position, in which the hollow inner section is substantially inserted in the hollow outer section, and an extended position, in which the hollow inner section projects outwards from the hollow outer section;
    wherein the hollow outer section is a regular hexagonal prism having six sidewalls, the hollow outer section further comprises a plurality of ribs interconnecting the six sidewalls to form the regular hexagonal prism, each of the plurality of ribs spans and interconnects three of the six sidewalls, the hollow outer section further comprises a top blocking member at a top opening of the hollow outer section, and the top blocking member is adapted to prevent the hollow inner section from moving out of the top opening of the hollow outer section, the top blocking member is a rectangular metal plate, a first edge of the top blocking member is mounted to the hollow outer section, a second edge of the top blocking member extends towards a central axis of the hollow outer section, and the second edge is opposite to the first edge, the hollow outer section further comprises a bottom blocking member at a bottom opening of the hollow outer section, and the bottom blocking member is adapted to prevent the hollow inner section from disengaging from the hollow outer section through the bottom opening, the bottom blocking member comprises a mounting portion mounted to the hollow outer section and an elastic portion protruding upwards from a top surface of the mounting portion, and the elastic portion is adapted to cushion the strike effect when the first hollow inner section projects from the hollow outer section.

2. The telescoping structure of claim 1, wherein the elastic portion is made of elastic plastic material.

* * * * *